United States Patent [19]

Yong-Min

[11] Patent Number: 4,684,926

[45] Date of Patent: Aug. 4, 1987

[54] UNIVERSAL SYSTEM OF ENCODING CHINESE CHARACTERS AND ITS KEYBOARD

[76] Inventor: Wang Yong-Min, c/o Computation Center, Henan Province, China

[21] Appl. No.: 609,900

[22] Filed: May 14, 1984

[51] Int. Cl.[4] .......................... G06F 3/02; B41V 5/00
[52] U.S. Cl. ............................... 340/365 R; 400/109; 400/110; 382/56
[58] Field of Search ............... 340/365 R, 365 S, 484; 400/110, 109; 382/56, 13

[56] References Cited

U.S. PATENT DOCUMENTS 4,379,288 4/1983 Leung et al. .................. 340/365 R
4,462,703 7/1984 Lee ................................... 400/110

Primary Examiner—James L. Rowland
Assistant Examiner—Ted Rittmaster
Attorney, Agent, or Firm—Kenyon & Kenyon

[57] ABSTRACT

A system includes a keyboard for encoding Chinese characters and phrases. The invention relates to the quick input of Chinese characters and phrases into any large, medium, small and mini-sized computers as well as systems for Chinese information processing and communications. Some basic roots are selected according to their frequency distributions both in the constitution of characters and in practical usage, and classified in accordance with their inner links and compatible relations. These selected roots are then arranged on the twenty five keys of a standard keyboard in accordance with the probabilities of use of keys and the fingering of the keyboard in order to form a complete encoding system and a keyboard for Chinese. In the system, Chinese characters and phrases can be encoded according to their geometrical forms. Therefore the method is direct and easy to learn and convenient for touch typing, and the efficiency of input Chinese characters and phrases can be raised greatly.

30 Claims, 7 Drawing Figures

| name of strokes | form of strokes | code names of strokes | key-code | direction of strokes | similar strokes |
|---|---|---|---|---|---|
| horizontal | — | 1 | G(11) | → | — — ╱ |
| vertical | \| | 2 | H(21) | ↓ | \| ı ] |
| left-falling | ╱ | 3 | N(31) | ╱ | ╱ ╱ |
| right-falling | ╲ | 4 | Y(41) | ╲ | ╲ ╲ |
| turning | 乙 | 5 | T(51) | 乙 | ㄱ ㄴ 乙 ㄅ ㄱ 亅 ㄴ |

| name of strokes | form of strokes | code names of strokes | key-code | direction of strokes | similar strokes |
|---|---|---|---|---|---|
| horizontal | ─ | 1 | G(11) | → | ─ ╲ |
| vertical | │ | 2 | H(21) | ↓ | │ │ ┘ |
| left-falling | ╱ | 3 | N(31) | ↙ | ╱ ╱ |
| right-falling | ╲ | 4 | Y(41) | ↘ | ╲ ╱ |
| turning | ⁊ | 5 | T(51) | ⁊ | ⁊ ⌐ ╯ ζ ⁊ ╚ |

Fig. 1

| pattern of characters | code name of patterns | topological patterns and examples |
|---|---|---|
| left-right | 1 | ▯江 ▯▯湘 ▯▯语 ▯▯部 |
| up-down | 2 | ▭节 ▭意 ▭花 ▭华 |
| embracing | 3 | ▯因 ▯同 ▯床 ▯这 ▯司 ▯区 |
| single | 4 | ⊠重 本 |

Fig. 2

| 55 ← 51 (turning) | 41 → 45 (right-falling) |
| 15 ← 11 (horizontal) | 21 → 25 |
| 35 ← 31 (left-falling) | (vertical) |

Fig.3

| key names | key-code | stroke-root | main roots | derivative roots |
|---|---|---|---|---|
| 王土大木廿 | G(11)<br>F(12)<br>D(13)<br>S(14)<br>A(15) | 一<br>二<br>三丁十<br>七匚丂 | 干千夫戈主王<br>士十丰毛<br>厂石戊尢甘甘丗<br>寸西<br>丁工开戈 | 舌<br><br>犬尸非手手長<br>束<br>廿卅云弋 |
| 目日口田山 | H(21)<br>J(22)<br>K(23)<br>L(24)<br>M(25) | ㅣㅏㅏ<br>刂刀刂刂<br>川<br>口<br>冂 | 上止卢<br>虫巴兄<br><br>四甲早車酉<br>由贝几门 | 广龙且<br>囗<br><br>皿四串<br>皿册同周用周鳥 |
| 禾白月人金 | N(31)<br>B(32)<br>V(33)<br>C(34)<br>X(35) | 丿卜<br>夕彳ヒ<br>夕幺<br>八<br>ク勹 | 乍欤彳攵夂<br>气手手斤<br>用乃牙永豕衣氏尺<br>亻<br>鱼鸟夕 | 禾<br><br><br>人今尒尔<br>亻犭乂金夕 |
| 言立水火之 | Y(41)<br>U(42)<br>I(43)<br>O(44)<br>P(45) | 丶<br>冫丷丬<br>氵<br>灬<br>才 | 文方主<br>六广辛<br>不古<br>小米业<br>又力冖宀 | 二亠歹去辶<br>宀<br>冫水火永<br>小业业小小<br>辶廴マ又 |
| 心子女巳丝 | T(51)<br>R(52)<br>E(53)<br>W(54)<br>Q(55) | 乙<br>屮山<br>巛儿<br>コ厶<br>互勹 | 习雨儿兀<br>了阝尸耳巴也<br>刀九臼艮彐<br>己巳尸马厶<br>弓匕 | 个木扌爿片<br>孑<br>艮<br>尸业曰<br>匕夕幺 |

Fig. 4

| section-number \ block-number | 1 | 2 | 3 | 4 | 5 |
|---|---|---|---|---|---|
| 1 | 王一 | 土二 | 大三 | 木 | 艹 |
| 2 | 目丨 | 日川 | 口川 | 田川 | 山 |
| 3 | 禾ノ | 白〃 | 月〃〃 | 人 | 金 |
| 4 | 言丶 | 立ハ | 水(氵) | 火灬 | 之 |
| 5 | 心乙 | 子〈〈 | 女巛 | 巳 | 彡 |

| the last stroke & its code name \ pattern & its code name | ⊞ 1 | ᗉ 2 | ⊡ 3 | ☐ 4 |
|---|---|---|---|---|
| — 1 | 11 Ⓖ | 12 Ⓕ | 13 Ⓓ | 14 Ⓢ |
| ｜ 2 | 21 Ⓗ | 22 Ⓙ | 23 Ⓚ | 24 Ⓛ |
| ／ 3 | 31 Ⓝ | 32 Ⓑ | 33 Ⓥ | 34 Ⓒ |
| ＼ 4 | 41 Ⓨ | 42 Ⓤ | 43 Ⓘ | 44 Ⓞ |
| ㄣ 5 | 51 Ⓣ | 52 Ⓡ | 53 Ⓔ | 54 Ⓦ |

Fig. 7

UNIVERSAL SYSTEM OF ENCODING CHINESE CHARACTERS AND ITS KEYBOARD

BACKGROUND OF THE INVENTION

This invention relates to a method for encoding Chinese characters and phrases, and a keyboard designed on the basis of the method. Using the present invention, Chinese characters and phrases can be quickly inputted entirely according to the form of the character, and the input is therefore suitable for the entry into any large, medium, small or mini-sized computer, as well as for Chinese information processing and communication systems.

In a Chinese information processing system, the quick input of individual characters and phrases is a major problem that calls for an urgent solution due to the extended use of computers in the countries and areas using Chinese characters. The prior art systems for encoding Chinese characters include encoding by stroke-form, encoding by whole characters at a large keyboard, and encoding by phonemes and morphemes combined. Some such systems involved encoding Chinese characters only on the basis of single stroke forms; others used their combinations or roots that often needed large numbers of roots without considering their inner links. The systems have disadvantages such as requiring large numbers of keys, special input devices, many rules to be remembered by the operator, complicated operations, too many identical codes and low input speed. In general, any user of the systems needs long special training in order to memorize their rules.

SUMMARY OF THE INVENTION

The present invention, for the purpose of creating a direct and easy-to-learn method, adopts a system of breaking down Chinese characters into roots and encoding them by spelling out the component roots. Hence the method to encode Chinese characters and phrases is compatible with high input speed systems. The roots are selected optimally and are arranged on keys of a standard keyboard; several tens of thousands of characters and phrases can be stored into a computer; the operator can key in texts at a speed of about 120-150 characters per minute without looking at the keyboard, and the efficiency of inputting characters and phrases can be raised enormously.

According to the invention, Chinese characters are regarded as a form of spelling made up of geometrical elements, and can be broken down into three levels, namely, stroke forms, roots and whole characters. Strokes are combined to form roots and roots to form characters. Each character includes at least one root. Each root includes at least one stroke and has an order within its respective character. Each stroke has a form and an order within its respective root. The orders of roots and strokes are determined by a traditional sequence of handwriting. This method does not consider pronunciation, nor does it break every character down into single strokes, but forms characters and phrases by roots or their codes which can be inputted on the keys of a keyboard in the sequence of writing characters by hand.

For the realization of the method of the invention tens of thousands of Chinese characters have been broken down into these roots and statistics have been compiled; the roots have been sorted according to the frequency distribution in constituting characters and in texts taken from different kinds of newspapers, books and magazines. After the consideration of large numbers of roots, optimally selected roots are sorted and their frequency distributions form an important foundation to the present encoding method.

BRIEF DESCRIPTION OF THE DRAWINGS

FIG. 1 shows numerical codes for five types of strokes of Chinese characters;

FIG. 2 shows four topological patterns of Chinese characters and gives examples;

FIG. 3 is a chart of blocks, in which roots are sorted in accordance with the numerical codes of the first stroke and the number of strokes forming the roots as well as the frequencies with which they are used;

FIG. 4 is a chart of all the selected roots;

FIG. 5 is a chart in which numerical codes for sections and blocks are shown;

FIG. 6 is a diagram of a keyboard in which the roots and their numerical codes are compatible.

FIG. 7 shows a cross-code of the last stroke and the character's pattern, sufficient to identify the character.

DETAILED DESCRIPTION OF THE PREFERRED EMBODIMENT

The basic strokes constituting roots can be characterized as horizontal, vertical, left-falling, right-falling, and turning. Each type of stroke includes those similar in form grouped according to the direction in which they are written by hand. The five types of strokes are then allotted the Arabic numerals 1, 2, 3, 4, and 5 as their respective codes in accordance with their probability of use as shown in FIG. 1. For example, the turning type includes several different turning strokes such as 乙, 乚, 丁, ㇅, ㇆, 一, 卜, ㇄.

In addition, character forms can be classified into four topological patterns, namely, left-right, up-down, embracing, and singular. These four patterns are distinguished by their visual effects and the positions of roots in characters and are allotted the Arabic numerals 1, 2, 3, and 4, as their respective codes in accordance with their frequencies of usage as shown in FIG. 2. For example, the topological patterns of 江, 活, 紛, 湘 are ⊞, ⊞, ⊞, ⊞, respectively, all called a "left-right" pattern and are allotted the code 1.

Figure 6:
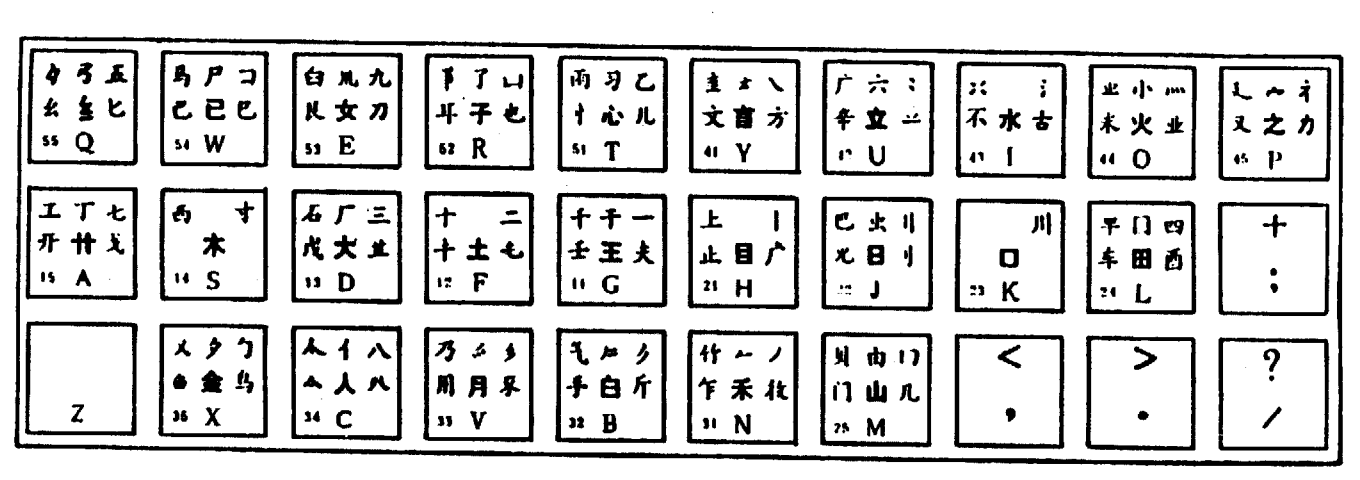

The roots were selected optimally, i.e. according to their frequency distribution both in constituting characters and in practical usage, and were then divided into five sections in accordance with the types of the first stroke of each root. The five sections are allotted the respective numerical codes 1, 2, 3, 4, and 5 according to their frequencies of usage. Each of the five sections is further divided into five blocks in accordance with the types of the second stroke of the roots or the number of basic strokes which form the roots. The five blocks in each section are allotted the respective numerical codes 1, 2, 3, 4, and 5 according to their frequencies of usage. Thus, there are altogether twenty-five blocks with each having a numerical code of two digits that represents its location as shown in FIG. 3. In the the two-digit code, the first digit is the section code, and the second digit is the block code. A chart of all the roots is shown in FIG. 4. The main roots in the chart of FIG. 4 which are in themselves characters are then arranged onto twenty-five keys (from letter A to Y) so as to form a diagram with twenty five blocks of roots. In each block, a most frequently used root is chosen to represent the name of the key, as shown in FIG. 4 and FIG. 6.

The above selected twenty five blocks of roots are arranged on twenty five keys of a standard keyboard in accordance with their probabilities of usage and a habitual fingering in order to form a keyboard for Chinese, as shown in FIG. 6.

According to the invention, one can encode or key in a character in units of roots in the sequence of writing the character by hand, and each character has at most four codes. For a character which has four roots, all the roots are keyed in in the sequence of writing by hand; and for a character whose roots exceed four, one need only key in the first three roots and the last root of the character. For example:

The character 照 can be broken down into 日, 刀, 口, ....

The character 赣 can be broken down into 土, 日, 十, 贝.

As for a character with less than four roots, a cross-code of the last stroke and the character's pattern, sufficient to identify the characters, should be keyed in after the codes of the roots. This cross-code is a combination of the code of the last stroke and that of the pattern of the character, as shown in FIG. 7. The same numerical code corresponding to the cross-code can be found on the keyboard. For example:

The character 汉 can be broken down into 氵, 又. Its code is (43, 45) plus its cross-code (41), in which the first digit of (41) refers to the code of the last stroke and the digit 1 to that of the pattern of the character.

The character 字 can be broken down into 宀, 子. Its code is (45,52), plus its cross-code (12).

The character 本 can be broken down into 木, 一. Its code is (14,11), plus its cross-code (14).

As for a character used as the name of a key, the code is to operate its key four times in succession. For example:

The character 土 is used as the name of the key F (12), so its code is FFFF (12, 12, 12, 12).

The character 言 is used as the name of the key Y. (41), so its code is YYYY (41, 41, 41, 41).

As for those roots on the keys, which are in themselves Chinese characters but are not used as the names of the keys, the process of encoding is to operate the key, and key in the codes of the first stroke, the second stroke and the last stroke of the character. For example:

The character 方 is on the key of letter Y (41), and so the first stroke is 丶 (Y, 41), the second stroke 一 (G, 11), the last 刀 (T, 51); and therefore its input code is YYGT (41, 41, 11, 51).

All single pattern characters other than those on the keyboard are broken down into roots available on the keyboard and then fed in. For example:

The character 丙 can be broken down into three roots, i.e. 一, 冂, 人. Its code is GMCO (11, 25, 34, 44)

The character 麦 can be broken down into three roots, i.e. 一, 彐, 人. Its code is GQCO (11, 55, 34, 44)

In the present invention, 650 characters have abridged codes, which means one needs feed in only the codes of the first two roots of such a character plus a space key. There are altogether several thousands of characters which can be encoded by keying in the codes of the first three roots of the characters plus an operation of space key. At the same time the method of inputting the whole code of a character can be adopted alternatively.

To solve the problem of low input speed, this invention adopts a method of encoding Chinese phrases that follows. Thousands of Chinese phrases composed of two or more characters are stored to meet the needs of different fields. The two types of codes, namely the codes of characters and the codes of Chinese phrases are compatible in the method. In the case of inputting any phrase, four keys are needed. In the process of inputting characters and phrases alternately, there is no need to shift or add a special operation. As for the encoding of a phrase comprising two characters, one need input only the codes of the first two roots of each character. Take the phrase 教学 for example, only the four roots 孑, 攵, ⺌, 冖 are needed and the code of the phrase is OEOF (44, 53, 44, 45). For a phrase of three characters, the encoding comprises the code of the first root of each of the first two characters and the codes of the first two roots of the third character. Take the phrase 操作员 for example, only the roots 扌, 亻, 口, 贝 are needed and the code of the phrase is BCKM (32, 34, 23, 25). To encode a phrase of four characters, only the code of the first root of each of the four characters are needed. Take the phrase 汉字编码 for example, the four roots 氵, 宀, 纟, 石 are needed and the code of the phrase is IPQD (43, 45, 55, 13). For a phrase of five characters or more, its endoding consists of the codes of the first root of each of the first three characters and the code of the first root of the last characters. Take the phrase 中华人民共和国 for example, only the four roots 口, 亻, 八, 囗 are needed and its code is KCCL (23, 34, 34, 24).

There are very few identical codes in this method for encoding characters. In case of identical codes, a more frequently used character will first appear at the right position of the line on the screen of a keyboard. If this character is what the operater needs, he can just go on to the following text and the character will remain automatically at the position. If not, he need only touch the space key to exchange that character for another one with the same code.

There are two kinds of alarm signals, a long pip and a short pip. The short one shows that there is no character corresponding to the input code, i.e. an empty code; and at the same time, the cursor stops moving. The long one shows that there is an identical code and the operator can handle it with the method just described.

When keying a character, the operator can use the reserved key Z instead of inputting a root for which he is at a loss for a moment, and then he can choose the right character from a line of characters with respective numerical codes shown on the screen.

One can alternatively input any character or phrases by using the five numerical keys of 1, 2, 3, 4 and 5 on the keyboard, that is, input the numerical codes corresponding to the roots of a character or a phrase.

In this system, the operator does not need to care about the order of inputting the roots of a character if he is uncertain about which root should be fed in first, and the result is the same. For example, the character 桃 can be keyed in the sequence of 木, 丶, 儿, or that of 木, 儿, 丶, and both ways give the same character.

I claim:

1. A method for encoding Chinese characters and phrases inputted from a keyboard, each of the phrases including at least two characters, each of the characters including at least one root, and each of the roots including at least one stroke, and each of the roots having a sequence within its respective character, and each of the strokes having a form and a sequence within its respective root, the sequences of roots and strokes being determined by the traditional sequence of Chinese handwriting, the method comprising:

(a) sensing a plurality of actuations of keys, which correspond to a break-down of the characters and phrases, in which break-down:
  (i) strokes are characterized as having one of a plurality of basic types in accordance with their forms;
  (ii) roots, selected according to a frequency distribution both in constituting characters and in practical usage, are classified into a plurality of sections, each root being classified according to a first one of the basic types which characterizes a first stroke of the root and each basic type of stroke is also considered to be a root; and
  (iii) each of the sections is divided into blocks, each of the blocks being identified by one of:
    A. a second one of the basic types which characterizes a second stroke of each root; and
    B. a number of strokes forming a root;
  the keys corresponding to the break-down in such a way that each of the plurality of keys corresponds to one of the blocks; and
(b) encoding the characters and phrases in response to the plurality of actuations, whereby the characters and phrases are encoded in accordance with the break-down into the blocks of roots.

2. The method of claim 1 comprising sensing the plurality of actuations of the keys which correspond to the break-down in which characters are characterized as having basic patterns.

3. The method of claim 1, comprising sensing the plurality of actuations of the keys which correspond to the break-down in which characters are characterized as having four basic patterns: left-right, up-down, embracing, and singular, corresponding to relative locations of roots within each character, the four basic patterns being allotted numerical codes 1, 2, 3, and 4, according to frequencies of the four basic patterns in practical Chinese usage.

4. The method of claim 1, comprising sensing the plurality of actuations of the keys which correspond to the break-down in which strokes are characterized as having five basic types: horizontal, vertical, left-falling, right-falling, and turning, each of the five basic types encompassing at least two strokes, the five basic types being allotted numerical codes 1, 2, 3, 4, and 5 according to frequencies of the five basic types in practical Chinese usage.

5. The method of claim 4, comprising sensing the plurality of actuations of the keys which correspond to the break-down in which roots are classified into five sections, the five sections being allotted numerical codes 1, 2, 3, 4, and 5.

6. The method of claim 5 comprising sensing the plurality of actuations of the keys which correspond to the break-down in which each of the sections is divided into five blocks, the five blocks of each section being allotted numerical codes 1, 2, 3, 4, and 5.

7. The method of claim 6, comprising sensing the plurality of actuations of the keys which correspond to the break-down in which:

(i) characters are characterized as having four basic patterns: left-right, up-down, embracing, and singular, the four basic patterns, corresponding to relative locations of roots within each character the four basic patterns being allotted numerical codes 1, 2, 3, and 4, according to frequencies of the four basic patterns in practical Chinese usage; and
(ii) twenty-five blocks of the roots are arranged on twenty-five keys of the keyboard arranged both in a traditional Western alphabetic placement and in accordance with a frequency of each of the twenty-five blocks in practical Chinese usage, each of the twenty-five blocks having a two-digit numerical code representing its location wherein:
  a. one digit of each two-digit numerical code represents the numerical code allotted to one of the five sections and another digit of each two-digit numerical code represents the numerical code allotted to one of the five blocks within the one of the five sections;
  b. for twenty of the twenty-five keys each numerical code also represents a combination of one of the five basic types with one of the four patterns, with one digit of each two-digit numerical code being the numerical code alloted to the one of the five basic types and the other digit of each two-digit numerical code being the numerical code allotted to the one of the four basic patterns; and
  c. a most frequently used root in each block is chosen to represent the name of the key in which the block is located.

8. The method of claim 7, comprising, for a character which is in itself a root and is used as the name of a key, sensing four actuations of the key in succession.

9. The method of claim 7, comprising, for a character which is in itself a root and appears on a key but is not used as the name of the key, sensing actuations of the key and of those keys which correspond to the first stroke of the character, the second stroke of the character and the last stroke of the character.

10. The method of claim 7, wherein a character having less than four roots is encoded in response to actuation of those keys which correspond to each root of the character and then of a key which corresponds to a combination of a last stroke of the character and one of the basic patterns which characterizes the character.

11. The method of claim 6, wherein characters and phrases are encoded in response to repeated actuation of five numerical keys labelled 1, 2, 3, 4, and 5 on the keyboard, the five numerical keys corresponding to numerical codes allotted to the five basic strokes, the five sections and the five blocks of each section of roots, and basic patterns of characters wherein characters are characterized as having four basic patterns: left-right, up-down, embracing, and singular, the four basic patterns corresponding to relative locations of roots within each character, being allotted numerical codes 1, 2, 3, and 4, according to frequencies of the four basic patterns in practical usage.

12. The method of claim 1, wherein a character having four roots is encoded in response to actuation of those keys which correspond to each root of the character.

13. The method of claim 1, wherein a character having more than four roots is encoded in response to actuation of those keys which correspond to the first three roots and the last root of the character.

14. The method of claim 1 comprising:

displaying on a screen a line of a plurality of characters corresponding to the plurality of actuations when the plurality of actuations corresponds to more than one character, the displaying being in order of frequency of usage of the plurality of characters;

encoding a first character in the line if there has been a displaying and if a shift key is not actuated; and encoding a later character in the line if there has been a displaying and if the shift key is actuated.

15. The method of claim 1, wherein each of the phrases is encoded in response to the actuation of not more than four keys, a phrase of two characters being encoded in response to actuation of those keys which correspond to the first two roots of each character, a phrase of three characters being encoded in response to actuation of those keys which correspond to the first root of each of the first two characters and the first two roots of the third character, a phrase of at least four characters being encoded in response to actuation of those keys which correspond to the first root of each of the first three characters and the first root of the last character.

16. A method for encoding Chinese characters and phrases inputted from a keyboard, the keyboard being coupled with a screen, each of the phrases including at least two characters, each of the characters including at least one root, each of the roots including at least one stroke, each of the roots having a sequence within its respective character, and each of the strokes having a form and a sequence within its respective root, the sequences of roots and strokes being determined by the traditional sequence of Chinese handwriting, the method comprising:

(a) sensing depression of a plurality of actuations of keys, wherein the keyboard has at least twenty-five keys, the twenty-five keys being arranged both in a traditional Western alphabetic placement and in accordance with a breakdown of characters and phrases, the break-down being such that:

(i) strokes are characterized as having one of five basic types: horizontal, vertical, left-falling, right-falling, and turning, in accordance with their forms, each of the five basic types encompassing at least two strokes, the five basic types being allotted respective numerical codes 1, 2, 3, 4, and 5;

(ii) roots, selected according to a frequency distribution both in constituting characters and in practical usage, are classified into five sections, each root being classified according to a first one of the five basic types which characterizes a first stroke of the root, and each of the five basic types of strokes is also considered to be a root, the five sections being allotted respective numerical codes 1, 2, 3, 4, and 5;

(iii) each of the five sections is divided into five blocks, each of the five blocks being identified by one of:

A. a second one of the five basic types which characterizes a second stroke of each root; and B. a number of strokes forming a root, the five blocks of each of the five sections being allotted respective numerical codes 1, 2, 3, 4, and 5; and (iv) characters are characterized as having one of four basic patterns: left-right, up-down, embracing, and singular, in accordance with relative locations of roots within each character, the four basic patterns being allotted respective numerical codes 1, 2, 3, and 4;

the keys corresponding to the break-down in such a way that each of the twenty-five keys corresponds to one of the blocks within one of the five sections, each of the twenty-five keys having a two-digit numerical code representing its location, one digit of which represents the numerical code allotted to the one section and another digit of which represents the numerical code allotted to the one block within the one section;

the keys being arranged according to a frequency of the blocks in practical Chinese usage;

each key being named with a most frequently used root within the one block within the one section; and the keys corresponding to the break-down in such a way that twenty of the twenty-five keys also correspond to a combination of one of the five basic types with one of the four basic patterns, the two-digit numerical codes of the twenty keys also representing the combination, one digit of each two-digit numerical code being the numerical code allotted to the one of the five basic types and the other digit of each two-digit numerical code being the numerical code allotted to the one of the four basic patterns;

(b) encoding the characters and phrases in response to the plurality of actuations, whereby the characters and phrases are encoded in accordance with the break-down into the five basic types of strokes, the four basic patterns of characters, and the blocks of roots, wherein the encoding includes:

(i) encoding a character which is in itself a root and is used as a name of a key in response to actuation of the key four times in succession;

(ii) encoding a character which is in itself a root but is not used as a name of a key in response to actuation of the key and those keys which correspond to the first stroke, second stroke and last stroke of the character;

(iii) encoding a character having four roots in response to actuation of those keys which correspond to each root of the character;

(iv) encoding a character having more than four roots in response to actuation of those keys which correspond to the first three roots and the last root of the character;

(v) encoding a character having less than four roots in response to actuation of those keys which correspond to each root and then depression of one of the twenty keys;

(vi) encoding a phrase of two characters in response to actuation of those keys which correspond to the first two roots of each character;

(vii) encoding a phrase of three characters in response to actuation of those keys which correspond to the first root of each of the first two characters and the first two roots of the third character; and (viii) encoding a phrase of at least four characters in response to actuation of those keys which correspond to the first root of each of the first three characters and the first root of the last character;

(c) displaying on a screen a line of a plurality of characters corresponding to the plurality of actuations when the plurality of actuations corresponds to more than one character, the displaying being in order of frequency of usage of the plurality of characters;

(d) encoding a first character in the line if there has been a displaying and if a shift key is not actuated; and (e) encoding a later character in the line if there has been a displaying and if the shift key is actuated.

17. The method of claim 1 or 16, comprising sensing the plurality of actuations of the keys which correspond to the break-down in which at least six hundred and fifty preselected characters have abridged codes, and each of the characters is encoded in response to actuation of those keys which correspond to the first two roots of the character and then a space key.

18. The method of claim 1 or 16, comprising sensing the plurality of actuations of the keys which correspond to the break-down in which at least one thousand preselected characters have abridged codes, and each of the characters is encoded in response to actuation of those keys which correspond to the first three roots of the character and then a space key.

19. The method of claim 1 or 16 comprising:
sensing actuation of at least one of the keys which corresponds to the break-down and actuation of a particular key which is reserved for representing a root which has not been identified;
displaying on a screen a line of a plurality of characters with respective numerical codes wherein each of the plurality of characters in the line corresponds to the at least one of the keys and wherein each of the characters contains a root substituted for the root which has not been identified;
encoding a correct character in the line in response to actuation of a second plurality of keys which correspond to the correct character.

20. The method of claim 1 or 16, wherein results of encoding characters are the same if the depression of the plurality of keys is not sensed in the traditional sequence of handwriting of the roots.

21. An apparatus for encoding Chinese characters and phrases, each of the phrases including at least two characters, comprising:
(a) at least twenty-five keys arranged in a traditional Western alphabetic placement and the twenty-five keys corresponding to a break-down of the characters and phrases into five basic types of strokes, four basic patterns of characters, and twenty-five blocks of roots, wherein:
(i) the five basic types of strokes are characterized by forms of the strokes;
(ii) the four basic patterns of characters are characterized by relative locations of roots within each character;
(iii) roots, selected according to a frequency distribution both in constituting characters and in practical Chinese usage, are classified into five sections, each root being classified according to a first one of the five basic types of strokes which characterizes a first stroke of the root, and each of the five basic types of stroke is also considered to be a root and each of the five sections is divided into five blocks, each of the five blocks being identified by one of:

a second one of the five basic types which characterizes a second stroke of each root; and
a number of strokes forming a root,
and wherein the twenty-five keys are assigned so that each of the twenty-five keys corresponds to one of the twenty-five blocks of roots and in accordance with a frequency of the twenty-five blocks in practical Chinese usage, and each of twenty of the twenty-five keys corresponds to one of twenty combinations of one of the five basic types of strokes with one of the four basic patterns of characters; and
(b) means for encoding the characters and phrases in response to a plurality of actuations of the twenty-five keys.

22. The apparatus of claim 21 wherein the four basic patterns are: left-right, up-down, embracing, and singular, corresponding to relative locations of roots within each character, and the four basic patterns are alloted numerical codes 1, 2, 3, and 4, according to their frequencies in practical Chinese usage.

23. The apparatus of claim 22 wherein the five basic types of strokes are: horizontal, vertical, left-falling, right-falling and turning, and each of the five basic types of strokes encompasses at least two strokes, and the five basic strokes are allotted numerical codes 1, 2, 3, 4, and 5 according to their frequency in practical Chinese usage.

24. The apparatus of claim 23 wherein
(i) each of the twenty-five keys has a two-digit numerical code representing its location wherein one digit of each two-digit numerical code represents one of the five sections and another digit of each two-digit numerical code represents one of the five blocks within the one of the five sections;
(ii) for twenty of the twenty-five keys each two-digit numerical code also represents a combination of one of the five basic types with one of the four patterns with one digit of each two-digit numerical code representing one of the five basic types and another digit of each two-digit numerical code representing one of the four basic patterns; and
(iii) a most frequently used root in each block is chosen to represent the name of the key in which the block is located.

25. The apparatus of claim 24 wherein five numerical keys labeled 1, 2, 3, 4, and 5 represent the numerical codes which in turn represent the five basic strokes, the five sections, the five blocks and the four basic patterns of characters so that two key sequences of the five numerical keys are useable in place of the twenty-five keys and in place of the twenty keys.

26. The apparatus of claim 21 comprising:
means for deducing from the plurality of actuations a plurality of characters when the plurality of actuations corresponds to more than one character;
a screen for displaying the plurality of characters;
means for detecting a selection by a user of one of the plurality of characters; and
means for second encoding a correct character in response to a selection detected by the means for detecting a selection.

27. The apparatus of claim 26 wherein:
the plurality of characters is displayed on the screen in order of frequency of usage; and
the means for detecting a selection includes a shift key which is not actuated to select a first of the plurality of characters and which is actuated to select a later one of the plurality of characters.

28. An apparatus for encoding Chinese characters and phrases, each of the phrases including at least two characters, each of the characters including at least one root, each of the roots including at least one stroke, each of the roots having a sequence within its respective character, and each of the strokes having a form and a sequence within its respective root, the sequences of roots and strokes being determined by the traditional sequence of Chinese handwriting, the apparatus comprising:

(a) at least twenty-five keys, the twenty-five keys being arranged in a traditional western alphabetic placement, the twenty-five keys corresponding to a break-down of the characters and phrases into basic types of strokes, basic patterns of characters, and blocks of roots, wherein:

(i) strokes are characterized as having one of five basic types: horizontal, vertical, left-falling, right-falling, and turning, in accordance with their forms, each of the five basic types encompassing at least two strokes, the five basic types being allotted a respective numerical code 1, 2, 3, 4 and 5;

(ii) roots, selected according to a frequency distribution both in constituting characters and in practical usage, are classified into five sections, each root being classified according to a first one of the five basic types which characterize a first stroke of the root, each of the five basic types of strokes also being considered a root, the five sections being allotted respective numerical codes 1, 2, 3, 4 and 5;

(iii) each of the five sections is divided into five blocks, each of the five blocks being identified by one of:

A. A second one of the five basic types which characterize the second stroke of each root; and B. A number of strokes forming a root; the five blocks of each of the five sections being allotted respective numerical codes 1, 2, 3, 4 and 5; and (iv) characters are characterized as having one of four basic patterns: left-right, up-down, embracing, and singular, in accordance with the relative locations of roots within each character, the four basic patterns being allotted respective numerical codes 1, 2, 3 and 4;

the keys corresponding to the break-down in such a way that each of the twenty-five keys corresponds to one of the blocks within one of the five sections, each of the twenty-five keys having a two-digit numerical code representing its location, one digit of which represents the numerical code allotted to the one section and another digit which represents numerical code allotted to the one block within the one section;

the keys being arranged according to a frequency of the blocks in practical Chinese usage;

each key being named with a most frequently used root within the one block with the one section; and the keys corresponding to the break-down in such a way that twenty of the twenty-five keys also correspond to a combination of one of the five basic types with one of the four basic patterns, the two digit numerical codes of the twenty keys also representing the combination, one digit of each two-digit numerical code being the numerical code alloted to the one of the five basic types and the other digit of each two-digit numerical code being the numerical code allotted to one of the four basic patterns;

(b) means for deducing characters and phrases from a plurality of actuations of the keys;

(c) means for encoding the characters and phrases deduced including:

(i) means for encoding a character which is itself a root and which is used as a name of a key in response to actuation of the key four times in succession;

(ii) means for encoding a character which is itself a root and which is not used as a name of a key in response to actuation of the key and those keys which correspond to the first stroke, second stroke, and last stroke of the character;

(iii) means for encoding a character having four roots in response to actuation of those keys which correspond to each root of the character;

(iv) means for encoding a character having more than four roots in response to actuation of those keys which correspond to the first three roots and the last root of the character;

(v) means for encoding a character having less than four roots in response to actuation of those keys which correspond to each root and then one of the 20 keys;

(vi) means for encoding a phrase of two characters in response to actuation of those keys which correspond to the first two roots of each character;

(vii) means for encoding a phrase of three characters in response to actuation of those keys which correspond to the first root of the first two characters and the first two roots of the third character; and (viii) means for encoding a phrase of at least four characters in response to actuation of those keys which correspond to the first root of each of the first three characters in the first root of the last character;

(d) means for first deducing from a plurality of actuations one of: an intended character and an intended phrase;

(e) means for first encoding the one of the intended character and the intended phrase deduced by the means for deducing;

(f) means for second deducing from the plurality of actuations a plurality of characters when the plurality of actuations correspond to more than one character;

(g) a screen for displaying the plurality of characters;

(h) means for detecting a selection by a user of one of the plurality of characters;

(i) means for second encoding a correct character in response to a selection detected by the means for detecting a selection.

29. The apparatus of claim 21 comprising:

an additional key reserved for representing a root which has not been identified;

means for displaying on the screen in response to actuation of the additional key, along with actuation of at least one of the twenty-five keys, a second plurality of characters with respective numerical codes, wherein each of the second plurality of characters corresponds to at least one of the twenty-five keys and wherein each of the second plurality of characters contains a root substituted for the root which has not been identified;

means for third encoding a desired character in the second plurality of characters in response to a second plurality of actuations of keys which corresond to the correct character.

30. The apparatus of claim 28 wherein the means for deducing deduces characters in response to a plurality of actuations of keys not in the traditional sequence of Chinese handwriting of the roots.

* * * * *

UNITED STATES PATENT AND TRADEMARK OFFICE
CERTIFICATE OF CORRECTION

PATENT NO. : 4,684,926

DATED : August 4, 1987

INVENTOR(S) : W. YONG-MIN

It is certified that error appears in the above-identified patent and that said Letters Patent is hereby corrected as shown below:

Abstract, line 18, change "input Chinese" to --input of Chinese--.

Column 2, line 62, change "In the the two" to --In the two--.

Column 3, line 3, change "twenty five" to --twenty-five--.

Column 3, line 4, change "twenty five" to --twenty-five--.

Column 3, line 63, change "needs" to --need--.

Column 4, line 15, change "example, only" to --example: only--.

Column 4, line 26, change "example, only" to --example: only the--.

UNITED STATES PATENT AND TRADEMARK OFFICE
CERTIFICATE OF CORRECTION

PATENT NO. : 4,684,926

DATED : August 4, 1987

INVENTOR(S) : W. YONG-MIN

It is certified that error appears in the above-identified patent and that said Letters Patent is hereby corrected as shown below:

Column 4, line 32, change "example, only" to --example: only--.

Column 6, line 3, change "patterns, corresponding" to --patterns corresponding--.

Column 6, lines 4 and 5, change "character the four" to --character, the four--.

Column 10, line 61, change "encoding a" to --encoding of a--.

Column 11, lines 67 and 68, change "two digit" to --two-digit--.

Column 12, line 58, change "encoding a" to --encoding of a--.

UNITED STATES PATENT AND TRADEMARK OFFICE
CERTIFICATE OF CORRECTION

PATENT NO. : 4,684,926

DATED : August 4, 1987

INVENTOR(S) : W. YONG-MIN

It is certified that error appears in the above-identified patent and that said Letters Patent is hereby corrected as shown below:

Column 12, line 61, change "21" to --28--.

Column 13, line 6, change "encoding a" to --encoding of a--.

Column 14, lines 1 and 2, change "corresond" to --correspond--.

Signed and Sealed this

Fourteenth Day of June, 1988

Attest:

DONALD J. QUIGG

*Attesting Officer*  *Commissioner of Patents and Trademarks*